United States Patent [19]

Streczyn

[11] 4,262,211

[45] Apr. 14, 1981

[54] LIQUID STORAGE DEVICE AND ENERGY GENERATOR

[76] Inventor: Michael V. Streczyn, 1128 W. Balboa Blvd., Newport Beach, Calif. 92661

[21] Appl. No.: 952,829

[22] Filed: Oct. 20, 1978

[51] Int. Cl.³ .................................................. F03B 7/00
[52] U.S. Cl. ........................................ 290/54; 290/43; 416/85
[58] Field of Search .................... 290/42, 43, 53, 54; 416/6, 84–86; 60/398, 496, 500, 501

[56] References Cited

U.S. PATENT DOCUMENTS

| 4,023,041 | 5/1977 | Chappell | 290/42 X |
|---|---|---|---|
| 4,038,821 | 8/1977 | Black | 416/85 X |
| 4,151,424 | 4/1979 | Bailey | 290/54 |

Primary Examiner—Gene Z. Rubinson
Assistant Examiner—W. E. Duncanson, Jr.
Attorney, Agent, or Firm—Willie Krawitz

[57] ABSTRACT

A system of floating, elongate, liquid storage containers are arranged in circular fashion for rotation about a generator positioned centrally of the system. The containers may be floated in relatively shallow waters which move at differential speed, such as between the shore and the center of a river, on the edge of a tidewater, etc. The differential water movement causes the entire pattern of storage containers to rotate and produce electrical energy.

The inertia of the system produces a relatively uniform supply of energy over an extended period of time.

12 Claims, 6 Drawing Figures

TO POWER ON SHORE

LIQUID STORAGE DEVICE AND ENERGY GENERATOR

BACKGROUND OF THE INVENTION

This invention relates to a floating liquid storage container system adapted to be rotated and generate electrical energy. The containers are preferably portable, which facilitates towing and also provides a permanent or semi-permanent liquid storage site.

Various sources of electrical energy are being used to supply present commercial and domestic power requirements. Of these energy sources, hydroelectric power is preferred since it represents a non-wasting asset which is relatively benign from the standpoing of pollution. However, hydroelectric generators require a high water drop location with a sufficient water supply, and such locations have been virtually exhausted.

Other hydroelectric facilities such as Pelton wheel generators could easily be built on flowing rivers, tidal basins, etc., however, the water velocity is usually too slow, and basically, there is no built-in storage capacity for these types of systems.

Electrical energy generated by ocean currents rising from the ocean depths have been proposed, but the capital equipment is expensive and there is no guarantee that once installed, the currents will maintain a fixed location.

A hydroelectric generating system is desired that utilizes inexpensive equipment, has good energy storage capability and which can be installed and removed easily. Furthermore, a hydroelectric facility is desired which does not require large expenditures of money for construction sites or pose hazards due to collapsing or unsafe dams.

THE INVENTION

According to the invention, an electrical generating system and floating liquid storage container is provided comprising: an electrical generator; a plurality of elongate, floating, liquid storage containers rotatably attached to the generator and adapted for rotation in a body of water moving at a differential speed relative to the containers. The containers may be detachably mounted to the generator to permit towing, and this enables transportation of the liquid or transfer of the liquid filled containers (with or without the generator) to a new generating location. This latter aspect is particularly useful when dictated by shifting tides, changes in river currents, river levels, etc.

DESCRIPTION OF THE PREFERRED EMBODIMENT

Figure 2:
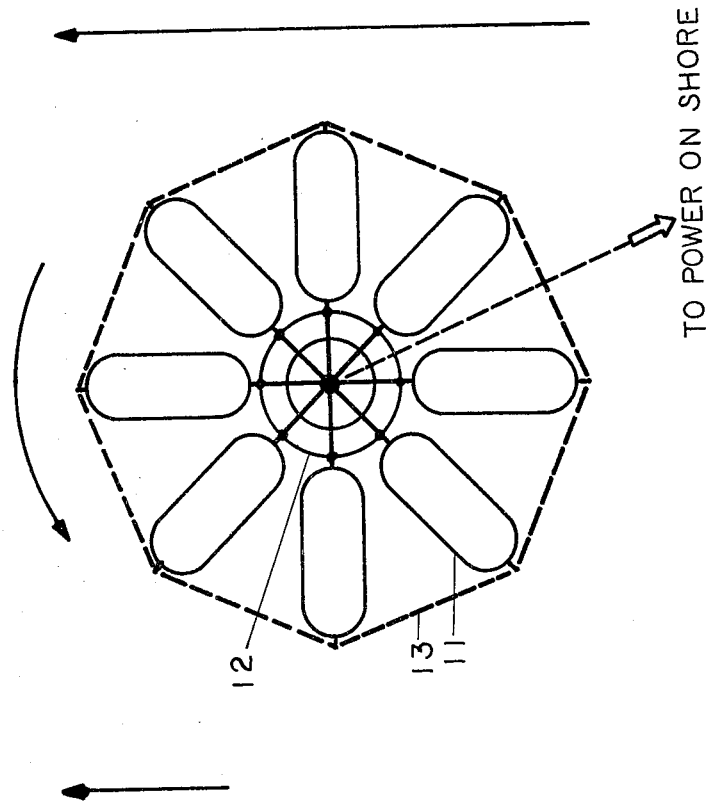
FIG. 2 is a plan view showing the containers positioned for rotation in a current having a differential speed across the path of its motion.
Figure 1:
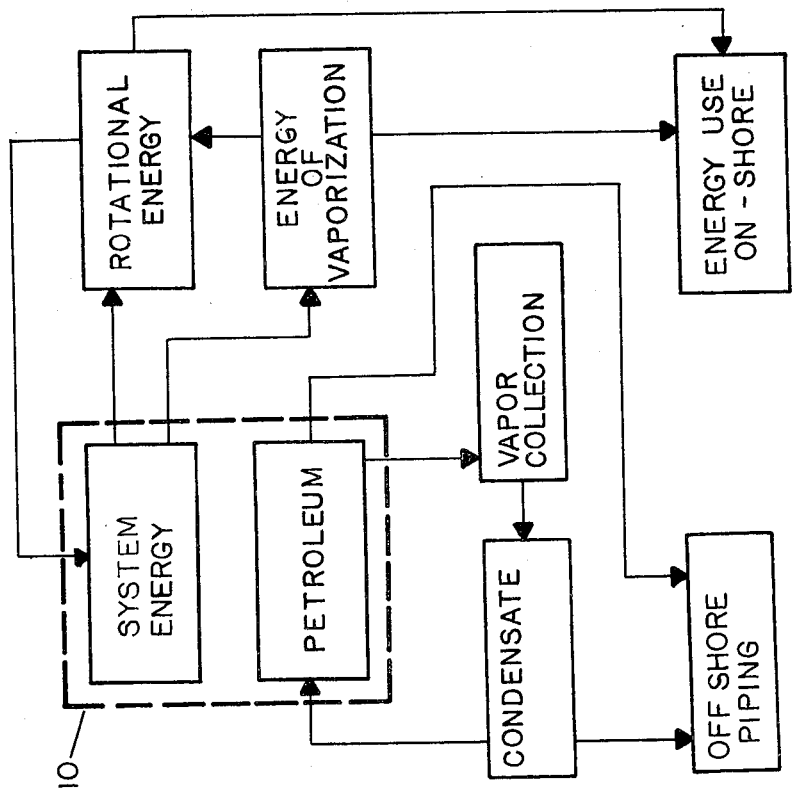
FIG. 1 is a system diagram showing the flow of electrical energy and flow of stored liquid in the rotating container system of this invention.

One embodiment of a liquid storage container and energy generating system 10 of this invention is shown in FIGS. 1 and 2, and comprises a plurality of storage containers 11, each rotatably mounted at one end to a generator 12 in a 'rosette' pattern; the generator is driven by the force of the rotating containers and may be detachably secured to a river bed, etc. A plurality of cables 13 are attached to the ends of the containers 11 and reduce their lateral motion during operation. The containers are preferably constructed of a resilient, inflatable material such as rubber, elastomers, etc., and this imparts flexibility and facilitates their transportation.

Rotational force is provided by locating the system 10 so that the containers will be contacted at one side by a differential water movement, viz., rapidly moving water on one side and slowly moving water at the other side which produces sufficient torque to rotate the containers. Liquid within the containers provides a sufficient weight to impart a high degree of inertia to the system and reduces energy fluctuations; thus, once in motion, the system does not run down or speed up easily. Typical container lengths may vary from about 20–1000 feet, with a diameter of about 5–50 feet. This wide variation in size can accommodate most rivers and off-shore areas.

Various types of liquids may be stored in the containers such as water, petroleum products, etc. One advantage in using water, especially inland, is that the containers can function as a long term reservoir which also can be portable and may be utilized to contain short term water run-off. Furthermore, if the container is damaged, any leakage therefrom obviously will be innocuous. In fact, the effect of hazardous spills can be reduced simply by discharging water from a container into the stream and dilute the contaminant.

FIG. 1 illustrates the overall operation, in which electrical energy produced by rotation of the containers 11 is fed from the system to off-shore use, part of the energy being utilized within the system itself for maintaining energy of rotation, pumping, lighting, heating, cooling, etc. In addition to energy of rotation, evaporation energy also may be utilized for off-shore use and for the system, and this will be discussed infra, in more detail. Liquid may be pumped into or out of the containers for storage purposes or for off-shore use; also, condensed vapor may be returned to the system or it simply may be forwarded off-shore.

Figure 3:
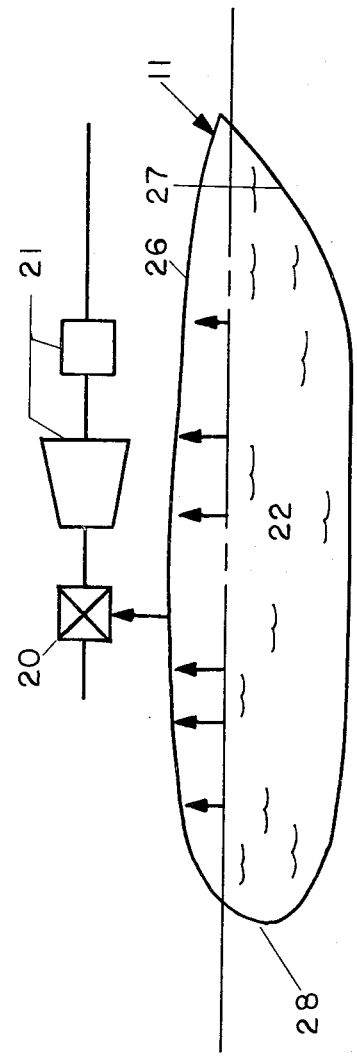
FIG. 3 is a cross section view in side elevation showing a container with means adapted to relieve pressure build-up of the contained liquid and generate energy therefrom and preferred surface curvatures of a container for towing purposes.

FIG. 3 illustrates one embodiment for collecting vapor due to evaporation, the container 11 being provided with a relief valve 20 and a turbine 21. During day time hours, heat accummulated in the container will evaporate some of the liquid 22, and a pressure build-up will occur. When the pressure exceeds a specified safety factor, it is passed through the relied valve 20 and drives the turbine 21 as it passes out of the container 11; energy collected from this operation is utilized as indicated in FIG. 1. During night time, cooling of the vapor will condense it for return to the container or for off-shore use.

FIG. 3 illustrates, in section, a preferred surface configuration of a container that will reduce drag when towed. The leading, above-water surface 26 is defined by the equation: $y=0.8x^{0.7}$; the leading, below-water surface 27 is defined by the equation: $y=1.9x^{0.9}$; and a trailing section having a surface 28 defined by the equation:

$$y = \frac{16x^{\frac{1}{2}}}{3},$$

the values of x being rounded off.

Figure 4:
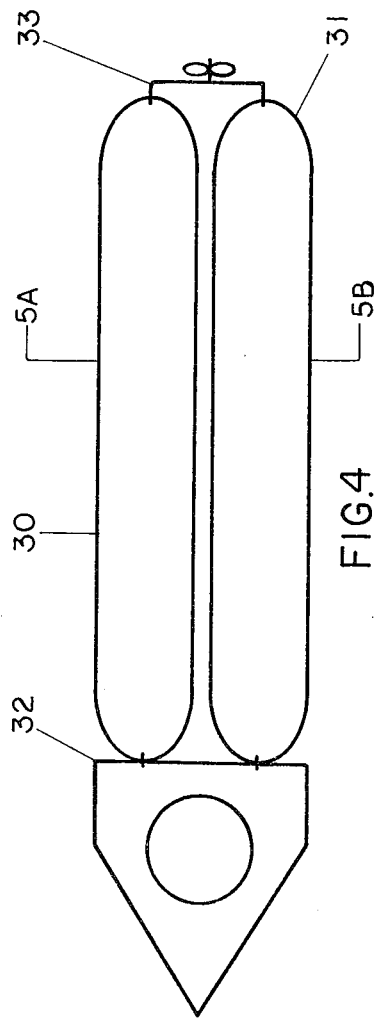
FIG. 4 is a plan view showing one embodiment of a balanced towing arrangement according to the invention; and, FIGS. 5a and 5b are cross sectional views taken along the lines 5—5 of FIG. 4 showing a stabilized towing means for the container.

FIG. 4 illustrates an embodiment employing two containers 30, 31 disposed adjacent each other and towed by a barge 32 providing a rear mounting propellor driven section 33. Since propellor turbulence (and hence energy) will not be directed to the containers and liquid therein, this is considered a safer towing technique.

Figure 5A:
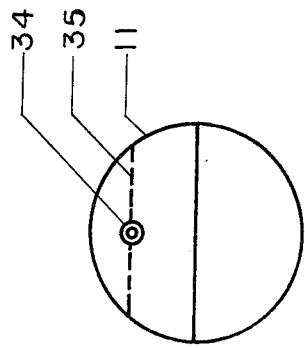
Figure 5B:
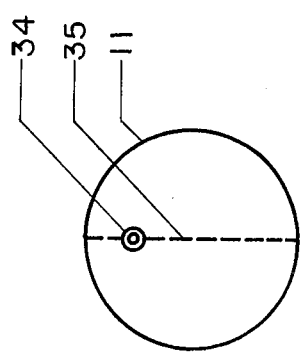

FIGS. 5a and 5b illustrate a construction which stabilizes the container and is particularly adapted for towing. Each container is provided with a tow cable 34, and the containers may be sectioned off either longitudinally or radially with a webbing or membrane 35. The longitudinal webbing reduces undulations of the container along its length, while use of a radial membrane enables the container to be sectioned off into compartments and reduce wave action within the container.

It will be appreciated that different variations of the invention may be employed without departing from the spirit thereof; for example, the containers may be oriented in a circular rather than a rosette pattern around the generator. Also, the containers may be shaped to provide the maximum resistance to the fastest water flow, and the minimum resistance to the slowest water flow.

I claim:

1. An electrical generating system and floating storage containers for storing liquid products off-shore, comprising:
    i. a plurality of inflatable, elongate, flexible containers adapted to be partially submerged in water when filled with liquid products, the containers being adapted for off-shore filling and discharge;
    ii. a generator disposed centrally of the floating containers;
    iii. the containers in storage position being floatably attached to the generator;
    iv. a plurality of the containers being adapted for rotational movement about the generator, thereby converting rotational energy into electrical energy when the containers are rotated by a differential movement of the water.

2. The apparatus of claim 1 in which the containers are oriented in a rosette pattern around the generator.

3. The apparatus of claim 1 in which the liquid products are selected from the class consisting of: water, petroleum products and chemicals.

4. The apparatus of claim 1 providing a container having a trailing surface portion, which in section, is defined by the equation:

$$y = \frac{16x^{\frac{1}{2}}}{3},$$

a leading surface portion having a below-water line surface which in section, is defined by the equation: $y=1.9x^{0.9}$, and an above-water line surface which, in section, is defined by the equation: $y=0.8x^{0.7}$, the length of a container being about 20–1000 feet and the diameter of the container being about 5–50 feet.

5. The apparatus of claim 1 in which a portion of the electrical energy generated by the containers is fed back to the system.

6. The apparatus of claim 1 in which the containers include a relief valve for heated vapor and a turbine generator driven by escaping vapor from the container.

7. A method of generating electrical energy and storing liquids off-shore comprising: providing a system of a plurality of inflatable, elongate, flexible containers adapted to be partially submerged in water when filled with liquid products, the containers being adapted for off-shore filling and discharge, and being rotatably mounted about a generator, whereby rotation of the containers about the generator is effected by differential movement of the water.

8. The method of claim 7 in which the containers are oriented in a rosette pattern around the generator.

9. The method of claim 7 in which the liquid products are selected from the class consisting of: petroleum, water and chemicals.

10. The method of claim 7, in which a portion of the electrical energy generated is fed back to the system.

11. The method of claim 7 in which the containers are detachably secured to the generator.

12. The method of claim 7 in which the containers include a turbine generator and a relief valve actuable for the escape of heated vapor, the turbine generator being driven by escaping vapor.

* * * * *